United States Patent
Vogt

(10) Patent No.: US 11,440,525 B2
(45) Date of Patent: Sep. 13, 2022

(54) METHOD AND DEVICE FOR SETTING AN IDLING SPEED OF AN INTERNAL COMBUSTION ENGINE OF A MOTOR VEHICLE AND MOTOR VEHICLE

(71) Applicant: AUDI AG, Ingolstadt (DE)

(72) Inventor: Michael Vogt, Munich (DE)

(73) Assignee: AUDI AG, Ingolstadt (DE)

( * ) Notice: Subject to any disclaimer, the term of this patent is extended or adjusted under 35 U.S.C. 154(b) by 391 days.

(21) Appl. No.: 16/469,303

(22) PCT Filed: Nov. 21, 2017

(86) PCT No.: PCT/EP2017/079971
§ 371 (c)(1),
(2) Date: Jun. 13, 2019

(87) PCT Pub. No.: WO2018/108467
PCT Pub. Date: Jun. 21, 2018

(65) Prior Publication Data
US 2020/0101962 A1    Apr. 2, 2020

(30) Foreign Application Priority Data
Dec. 15, 2016 (DE) ............ 10 2016 225 198.8

(51) Int. Cl.
*B60W 10/06* (2006.01)
*B60W 10/02* (2006.01)
(Continued)

(52) U.S. Cl.
CPC ............ *B60W 10/06* (2013.01); *B60W 10/02* (2013.01); *B60W 10/08* (2013.01);
(Continued)

(58) Field of Classification Search
CPC ...... B60W 10/06; B60W 10/02; B60W 10/08; B60W 30/18109; B60W 20/00;
(Continued)

(56) References Cited

U.S. PATENT DOCUMENTS

2003/0205930 A1* 11/2003 Smart .................. B60W 10/04
303/20
2009/0115373 A1* 5/2009 Kokotovich ........... B60K 6/547
320/137
(Continued)

FOREIGN PATENT DOCUMENTS

| CN | 2288100 Y | 8/1998 |
| CN | 1368919 A | 9/2002 |

(Continued)

OTHER PUBLICATIONS

European Office Action dated Oct. 7, 2020, in connection with corresponding EP Application No. 17 801 708.3 (14 pp., including machine-generated English translation).

(Continued)

*Primary Examiner* — Richard W Ridley
*Assistant Examiner* — Aimee Tran Nguyen
(74) *Attorney, Agent, or Firm* — Maier & Maier, PLLC

(57) ABSTRACT

A method for setting an idling speed of an internal combustion engine of a motor vehicle, in which the idling speed of the internal combustion engine is increased if a predetermined power request within an on-board power system of the motor vehicle is detected, wherein a generator for electrically supplying the on-board power system is driven by the internal combustion engine, and wherein the internal combustion engine is connected to a transmission of the motor vehicle, wherein the connection between the internal combustion engine and the transmission is disconnected, and/or a predetermined braking force is made available by (Continued)

means of at least one brake of the motor vehicle if the predetermined power request is detected.

14 Claims, 2 Drawing Sheets

(51) Int. Cl.
*B60W 10/08* (2006.01)
*B60W 30/18* (2012.01)
*B60W 20/00* (2016.01)
*F02D 41/02* (2006.01)
*F02D 41/08* (2006.01)
*B60W 30/188* (2012.01)

(52) U.S. Cl.
CPC ........ *B60W 30/18109* (2013.01); *B60W 20/00* (2013.01); *B60W 30/1884* (2013.01); *B60W 30/1886* (2013.01); *B60W 2710/065* (2013.01); *B60W 2710/083* (2013.01); *F02D 41/022* (2013.01); *F02D 41/083* (2013.01)

(58) Field of Classification Search
CPC ......... B60W 30/1884; B60W 30/1886; B60W 2710/065; B60W 2710/083; F02D 41/022; F02D 41/083
See application file for complete search history.

(56) References Cited

U.S. PATENT DOCUMENTS

| | | | | |
|---|---|---|---|---|
| 2009/0288895 | A1* | 11/2009 | Klemen | B60W 10/18 180/65.25 |
| 2010/0332062 | A1* | 12/2010 | Goto | B60W 50/0097 701/22 |
| 2011/0012553 | A1* | 1/2011 | Sloan | B60K 6/445 320/105 |
| 2012/0302397 | A1* | 11/2012 | Habbani | B60W 10/26 477/5 |
| 2016/0111758 | A1* | 4/2016 | Stimm | H01M 10/0525 324/430 |

FOREIGN PATENT DOCUMENTS

| | | | |
|---|---|---|---|
| CN | 1470405 A | 1/2004 | |
| CN | 1520495 A | 8/2004 | |
| CN | 1778610 A | 5/2006 | |
| CN | 201516800 U | 6/2010 | |
| CN | 103661354 A | 3/2014 | |
| CN | 104833530 A | 8/2015 | |
| CN | 204774662 U | 11/2015 | |
| CN | 105667492 A | 6/2016 | |
| DE | 42 00 806 C1 | 1/1993 | |
| DE | 103 36 758 A1 | 9/2004 | |
| DE | 103 26 935 A1 | 1/2005 | |
| DE | 10326935 A1 * | 1/2005 | ............ B60W 10/30 |
| DE | 10 2006 044 889 A1 | 4/2007 | |
| DE | 10 2007 004 171 A1 | 7/2008 | |
| DE | 102008037031 A1 * | 2/2010 | ............... B60K 6/48 |
| DE | 10 2013 204 901 A1 | 10/2013 | |
| DE | 10 2014 105 284 A1 | 10/2014 | |
| DE | 10 2015 212 891 A1 | 1/2016 | |
| EP | 1 221 394 A1 | 7/2002 | |
| EP | 2 094 533 B1 | 4/2016 | |
| FR | 3 026 992 A1 | 4/2016 | |

OTHER PUBLICATIONS

German Office Action dated Mar. 1, 2021, in connection with corresponding DE Application No. 17 801 708.3 (14 pp., including machine-generated English translation).

Chinese Office Action dated Apr. 28, 2021, in connection with corresponding CN Application No. 201780077888.0 (22 pp., including machine-generated English translation).

International Preliminary Report on Patentability dated Jun. 27, 2019 in corresponding International Application No. PCT/EP2017/079971; 8 pages.

Examination Report dated Aug. 9, 2017 of corresponding German application No. 10 2016 225 198.8; 12 pages.

International Search Report and Written Opinion of the International Searching Authority dated Feb. 26, 2018 in corresponding International application No. PCT/EP2017/079971; 28 pages.

* cited by examiner

METHOD AND DEVICE FOR SETTING AN IDLING SPEED OF AN INTERNAL COMBUSTION ENGINE OF A MOTOR VEHICLE AND MOTOR VEHICLE

FIELD

The disclosure relates to a method for setting an idling speed of an internal combustion engine of a motor vehicle in which the idling speed of the internal combustion engine is increased if a predetermined power request within an on-board power system of the motor vehicle is detected, wherein a generator for electrically supplying the on-board power system is driven by means of the internal combustion engine, and wherein the internal combustion engine is connected to a transmission of the motor vehicle. Furthermore, the present invention relates to a device for setting the idling speed of an internal combustion engine. Finally, the disclosure relates to a motor vehicle having such a device.

BACKGROUND

The interest is directed to internal combustion engines for motor vehicles. Such an internal combustion engine can be used to drive the motor vehicle. In addition, the internal combustion engine can be used to drive the transmission which provides electric power for an on-board system of the motor vehicle. In conventional motor vehicles, the demand of the on-board system is on average met by the generator. In phases of high electrical load, capacity is limited by the generator characteristics, and there may be a power deficit.

Motor vehicles with a hybrid drive train typically have more powerful electric machines installed which can provide a drive torque to the crankshaft of the internal combustion engine and can pick up a generator torque from the crankshaft. Since the electric power requirement is higher compared to conventional vehicles and various system restrictions may apply, one operating variant is to supply the electrical consumers with power by means of the generator. Such system restrictions can include, for example, heating of the components, the characteristics of the electric machine, a depleted 12V battery and/or a disconnected high-voltage battery. It is then not necessary to involve the batteries of the motor vehicle and particularly the high-voltage battery or the medium-voltage battery. But this can result in higher torques or torque gradients at the crankshaft in idling situations of the internal combustion engine.

When the motor vehicle is in operation, emergency mode situations may occur in which no electric power can be provided by the medium-voltage battery and/or the high-voltage battery. This can for example occur in regions with high ambient temperatures. To provide customer operation in emergency mode situations with a disconnected medium-voltage battery or high-voltage battery, the 12V power draw must be compensated very soon because the capacity of the 12V battery is limited. This can be achieved by voltage control in a mild hybrid. The idling speed can only be increased in a stationary vehicle if the vehicle is securely held. It is required for this purpose that a sufficient brake pressure is provided when the transmission is non-positively engaged, that the transmission is in the park or neutral position, and/or that a fixing system is activated. In internal combustion engines configured as spark-ignition engines, the tolerable absolute torque limit and the potential torque gradient are systemically lower than in turbocharged diesel engines.

If the idling speed of the internal combustion engine is not increased, particularly in emergency mode situations, the idling behavior of the internal combustion engine will not reach the quality expected by the driver. In addition, stalling of the engine cannot reliably be prevented. Furthermore, load is applied to the transmission in its engaged state. The required speed increase in a stationary vehicle with a non-positively engaged transmission would thermally and mechanically strain the transmission beyond the usual extent.

In this context, document DE 10 2007 004 171 A1 describes a method for setting the idling speed of an internal combustion engine of a motor vehicle, wherein the internal combustion engine drives an electric generator.

It is envisaged that the idling speed is set as a function of a utilization of the electric generator. As soon as the on-board system voltage drops below a value, the idling speed of the internal combustion engine is increased. This increases the maximum power the electric generator can deliver and ensures the supply of the on-board power system and prevents discharging of the starter battery.

Furthermore, document EP 2 094 533 B1 discloses a method for reducing a power consumption of a motor vehicle having an internal combustion engine. The internal combustion engine is operated at a first speed in a first operating state and at a second speed, which is higher than the first speed, in a second operating state. Furthermore, an imminent special driving situation is detected in advance based on the previous behavior of the driver when driving the vehicle and/or on the vehicle, and the internal combustion engine is switched from the first operating state to the second operating state. Thus on-board system voltage can be stabilized by the initiated increase in speed of the internal combustion engine. Increasing the speed can be particularly useful in the idling range of the internal combustion engine.

In addition, document DE 10 2014 105 284 A1 discloses a method for compensating a transmission drag torque during engine idling. A signal for increasing the engine torque output is provided to the engine to substantially maintain an engine idling speed as the clutch position changes.

Furthermore, document DE 10 2013 204 901 A1 describes an engine control module, which can work in a speed mode in which the engine control module keeps an actual speed of an engine at a desired speed. The engine control module can compensate for a known load to prevent a stall by increasing an idling speed and/or creating a torque reserve before the load is applied.

It is the problem of the present invention to identify a solution to increasing the idling speed of an internal combustion engine of a motor vehicle in a safe and reliable manner.

SUMMARY

A method according to the invention is used to set an idling speed of an internal combustion engine of a motor vehicle. The idling speed of the internal combustion engine is increased if a predetermined power request is detected within an on-board power system of the motor vehicle. The internal combustion engine is used to drive a generator for the power supply of the on-board power system. In addition, the internal combustion engine is connected to a transmission of the motor vehicle. The connection between the internal combustion engine and the transmission is disconnected and/or a predetermined braking force is provided by means of at least one brake of the motor vehicle if the predetermined power request is detected.

The method is to be used to set or increase the idling speed of the internal combustion engine. The internal combustion engine may for example be a spark-ignition engine or a diesel engine. The idling speed of the internal combustion engine is increased if the predetermined power request is detected within the on-board power system of the motor vehicle. The on-board power system may particularly be a low-voltage on-board power system or a 12V on-board power system. This on-board power system is electrically connected to the generator either directly or indirectly via voltage transformers, while the generator may be driven by means of the internal combustion engine. As soon as the generator is driven by means of the internal combustion engine, it generates electric power, which is then fed into the on-board power system. The predetermined power request can be output because the electrical consumers of the motor vehicle, which the on-board power system supplies with electric power, are currently in need of electric power. The power request may further take into account that this electric power is not to be provided by the on-board power system or an energy storage device of the on-board power system. As soon as this predetermined power request is detected, the speed of the internal combustion engine is increased. This also increases the electric power the generator feeds into the on-board power system, and the system becomes robust against variable withdrawals of electric power.

According to an essential aspect of the invention, the connection between the internal combustion engine and the transmission is disconnected and/or a predetermined braking force is provided by means of at least one brake of the motor vehicle if the predetermined power request is detected. This particularly applies to the case when the transmission is in a driving gear for forward or reverse driving. If the predetermined power request occurs in this state in which the transmission is in a non-positive connection with the internal combustion engine, either the non-positive connection between the transmission and the internal combustion engine is disconnected or the predetermined braking force for braking the motor vehicle is provided by means of at least one brake of the motor vehicle. Another option is that both the connection between the transmission and the internal combustion engine is disconnected and the braking force is provided. A clutch of the motor vehicle or transmission can be activated to disconnect the transmission from the internal combustion engine. The brake which is activated to brake the motor vehicle may be a friction brake and a parking brake. Since the internal combustion engine is decoupled from the transmission, the drag torque of the transmission is eliminated at the internal combustion engine. This leaves a reserve for electric loads. This means that the internal combustion engine can drive the generator accordingly. In addition, stalling of the internal combustion engine can reliably be prevented. This allows overall safe and reliable adjustment of the idling speed of the internal combustion engine.

It is preferred that the predetermined power request is determined as a function of a torque to be provided by the internal combustion engine and/or a gradient of the torque to be provided. Depending on the power request which is needed within the on-board power system, the torque needed from the internal combustion engine to compensate for the power request can be determined. Particularly, the torque gradient the internal combustion engine must deliver can be determined. The torque gradient describes the time in which the torque must be delivered. The torque or torque gradient from which the idling speed must be increased is known from the configuration of the internal combustion engine. In addition, characteristics of the generator can be considered when determining the power request. This allows precise determination of the power request in the presence of which the idling speed is increased.

In one embodiment, a check is performed if an emergency mode situation applies in which transfer of electric power from a high-voltage storage device and/or a medium-voltage storage device of the motor vehicle to a high-voltage on-board power system and/or a medium-voltage on-board power system does not occur. Such emergency operation may occur if the high-voltage storage device and/or the medium-voltage storage device are not available and the generator is at the same time part of the high-voltage on-board power system and/or the medium-voltage on-board power system. In this case, the electric power from the high-voltage on-board power system and/or the medium-voltage on-board power system must be set low by means of a voltage transformer. In this manner, the consumers in the on-board power system or the 12V battery power system can be supplied sufficient power and the on-board power system can operate stably. This applies likewise to electric voltages in the high-voltage on-board power system and/or the medium-voltage on-board power system. In this case, it is required as well that the consumers receive a stable supply voltage. If such an emergency mode situation has occurred and the predetermined power request is detected within the on-board power system, the non-positive connection between the internal combustion engine and the transmission is disconnected and/or the braking force is provided by means of the at least one brake. Such an emergency mode situation may for example occur at high ambient temperatures or after a relatively long operating time of the motor vehicle. In this case, it is for example not possible that electric power from the high-voltage on-board power system and/or the medium-voltage on-board power system is transferred into the on-board power system. In this emergency mode situation, the idling speed of the internal combustion engine must be increased.

According to one embodiment, disconnecting the connection between the internal combustion engine and the transmission and providing the predetermined braking force are performed simultaneously. The connection between the internal combustion engine and the transmission may for example be disconnected by activating a clutch. Furthermore a fixation management system of the motor vehicle can be activated, which in turn can activate the brakes for providing the predetermined braking force. The transmission and the fixation management system can be activated at the same time or in parallel. If for example a connection between the internal combustion engine and the transmission cannot be disconnected, the motor vehicle can be braked or fixated accordingly. This can prevent that the motor vehicle moves due to the idling speed increase.

According to an alternative embodiment, first the connection between the internal combustion engine and the transmission is disconnected, then the predetermined braking force is provided. This sequential activation can prevent mechanical strain on the transmission.

It is further advantageous that the idling speed is increased if the connection between the internal combustion engine and the transmission is disconnected and/or the predetermined braking force is provided. Initially, the system can check if the non-positive connection of the transmission and the internal combustion engine is disconnected and/or the motor vehicle is braked or fixated accordingly. If this condition is met, the idling speed may be increased. The idling speed can thus be increased in a safe manner.

According to another embodiment, the method is performed if the transmission is in a driving gear for forward or reverse driving. The transmission is preferably an automatic transmission and particularly an automatic transmission with a torque converter. The transmission preferably comprises a torque converter clutch. If the transmission is in a driving gear, there is a non-positive connection between the transmission and the internal combustion engine. It is required that this non-positive connection is disconnected and/or the vehicle is braked accordingly. Furthermore, it is preferred that the method is performed when the motor vehicle is stationary.

A device according to the invention is used to set an idling speed of an internal combustion engine of a motor vehicle, wherein a generator for supplying an on-board power system of the motor vehicle with electric power can be driven by the internal combustion engine and wherein the internal combustion engine is connected to a transmission of the motor vehicle.

The device includes a detection means for detecting a predetermined power request within the on-board power system. Furthermore, the device includes a control means for increasing the idling speed of the internal combustion engine if the detection means detects the predetermined power request. The control means is adapted to output a control signal for disconnecting the connection between the internal combustion engine and the transmission and/or for providing a predetermined braking force by means of at least one brake of the motor vehicle if the detection means detects the predetermined power request. The device is adapted to perform the method according to the invention in the preferred embodiments thereof.

A motor vehicle according to the invention includes a device according to the invention. Furthermore, the motor vehicle includes an internal combustion engine, a generator, an on-board power system, and a transmission. The transmission is preferably configured as an automatic transmission with a torque converter. The motor vehicle may for example be configured as a passenger vehicle. Furthermore, the motor vehicle may be configured as a hybrid vehicle.

BRIEF DESCRIPTION OF THE DRAWINGS

The embodiments presented with reference to the method according to the invention and their advantages apply accordingly to the motor vehicle according to the invention.

Exemplary embodiments of the invention will be described below. Wherein:

DETAILED DESCRIPTION

Figure 1:
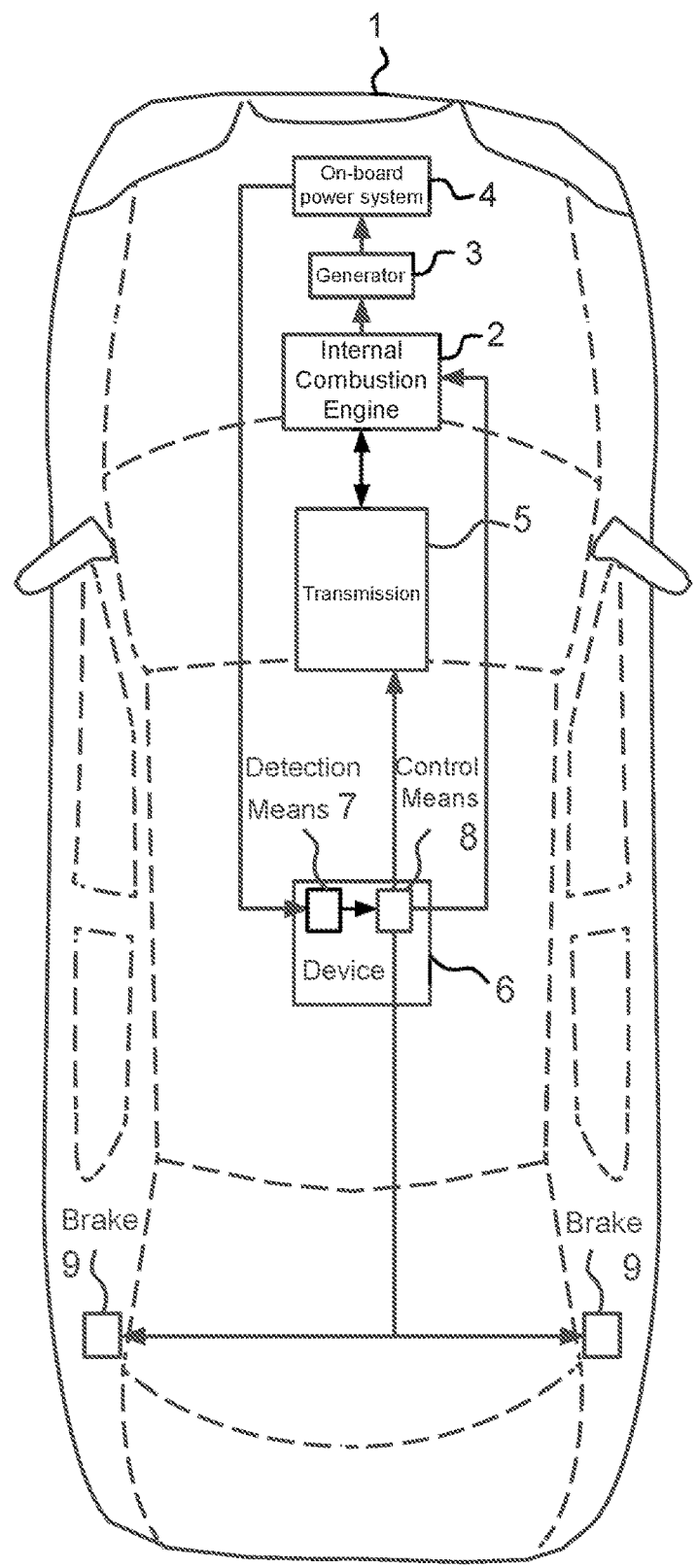
Figure 2:
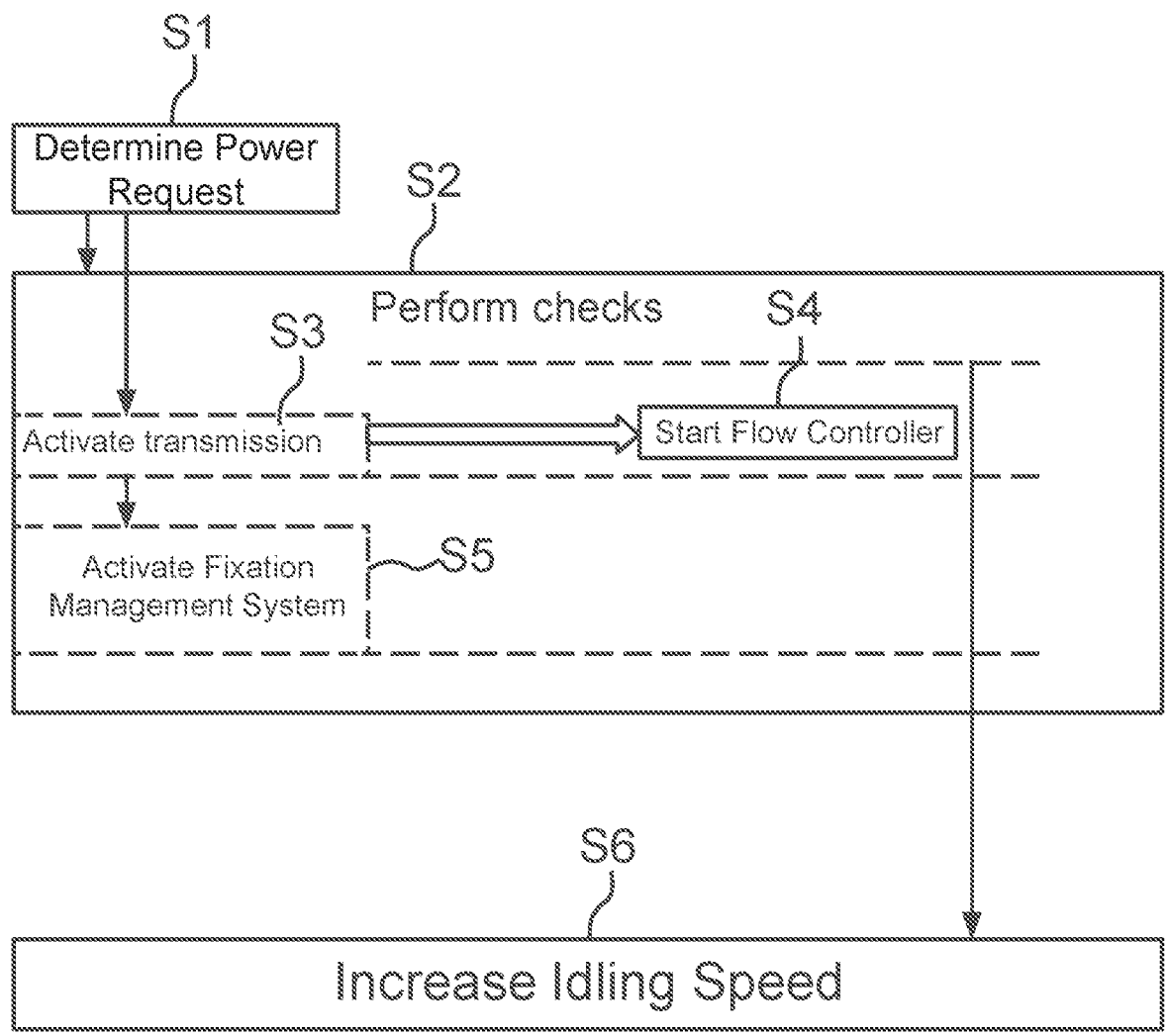

FIG. 1 shows a motor vehicle according to one embodiment of the present invention, which vehicle comprises a device for setting the idling speed of an internal combustion engine; and FIG. 2 shows a schematic flow chart of a method for setting the idling speed of the internal combustion engine.

The exemplary embodiments explained below are preferred embodiments of the invention. In these exemplary embodiments, the components of the exemplary embodiment described each represent individual features of the invention which are to be considered independently, which features also separately develop the invention further and should therefore be considered a part of the invention, both by themselves and in another combination than the combination shown. Furthermore, the embodiments described can be supplemented by other features of the features of the invention already described.

Functionally identical elements are identified by the same reference symbols in the figures.

FIG. 1 shows a plan view of a motor vehicle 1 according to an embodiment of the present invention. The motor vehicle 1 is configured as a passenger vehicle in this figure. The motor vehicle 1 includes an internal combustion engine 2, which is used to drive the motor vehicle 1. Furthermore, the motor vehicle 1 includes a generator 3, which can be driven by the internal combustion engine 2. The generator 3 can provide electric power for supplying an on-board power system 4 of the motor vehicle 1. The on-board power system 4 may particularly be an on-board power system with multiple voltage levels or a pure 12V on-board power system. Furthermore, the motor vehicle 1 includes a transmission 5, which can be non-positively connected with the internal combustion engine 2 via a clutch not shown herein. The internal combustion engine 2, the generator 3, the on-board power system 4, and the transmission 5 are only outlined schematically herein.

Furthermore, the motor vehicle 1 includes a device 6, which can be used to set an idling speed of the internal combustion engine 2. The device 6 includes a detection means 7, with which a predetermined power request within the on-board power system 4 can be detected. The predetermined power request may describe a condition in which electric power for supplying the electrical consumers is needed within the on-board power system 4. To meet this power request, the internal combustion engine 2 can drive the generator 3, such that electric power is fed into the on-board power system 4. The predetermined power request described a condition in which it is necessary to increase the idling speed of the internal combustion engine 2, since otherwise there is a risk that the internal combustion engine 2 may stall.

If the detection means 7 detects the predetermined power request, a control means 8 of the device 6 is activated. The control means 8 can be used to activate the transmission 5, such that the non-positive connection between the transmission 5 and the internal combustion engine 2 is disconnected. Furthermore, the control means 8 activates at least one brake 9 of the motor vehicle 1, such that said brake provides a predetermined braking pressure or a predetermined braking force, respectively. Thus the motor vehicle 1 can be braked and fixated accordingly. Finally, the control means 8 can activate the internal combustion engine 2, such that the idling speed of the internal combustion engine 2 is increased.

FIG. 2 shows a schematic flow chart of a method for setting the idling speed of the internal combustion engine 2. In a step S1, the predetermined power request is detected within the on-board power system 4. This results in the need to increase the speed of the internal combustion engine 2.

In a step S2, a check is performed if the idling speed of the internal combustion engine 2 can be increased. Initially, a check can be performed whether the transmission 5 is in a driving gear for forward or reverse driving. In this case, the transmission 5 is non-positively connected to the internal combustion engine 2. Another check can be performed whether the motor vehicle 1 is stationary. It can further be ensured that the driver of the motor vehicle 1 does not currently operate the accelerator pedal and thus does not desire an acceleration of the motor vehicle 1. In addition, a check can be performed if there is an emergency mode situation, in which the on-board power system 4 cannot be supplied with electric power from additional power sources. Such additional power sources may include, for example, a high-voltage on-board power system or a medium-voltage on-board power system. If these criteria are met, the method can be continued in a step S3.

In the step S3, the transmission 5 is activated such that the non-positive connection between the transmission 5 and the internal combustion engine 2 is disconnected. Then a flow controller can be started in a step S4. In addition, a fixation management system of the motor vehicle 1 is activated in a step S5, such that brakes 9 provide the predetermined braking pressure. After checking whether the non-positive connection between the transmission 5 and the internal combustion engine 2 was disconnected and that the brakes 9 provide the predetermined braking pressure, the idling speed of the internal combustion engine 2 can be increased in a step S6.

Overall, these examples show how the invention can be used to increase the idling speed of an internal combustion engine 2 in a safe and reliable manner if a predetermined power request is present within the on-board power system 4. This invention is particularly suitable if the transmission 5 of the motor vehicle 1 is in a driving gear and/or if an emergency mode situation has occurred. In addition, the method can be used for on-board power systems 4 which comprise multiple voltage levels. For example, the on-board power system may include a medium-voltage system and/or a high-voltage system in addition to the 12V on-board power system. The use of the method or device 6, respectively, is particularly suitable for 48V configurations because the generators 3 are not powerful enough over the entire speed range to supply all consumers, while at the same time the number of electrical consumers has increased compared to pure 12V on-board power systems.

The invention claimed is:

1. A method for setting an idling speed of an internal combustion engine of a motor vehicle, comprising:
   detecting a predetermined power request within an on-board power system of the motor vehicle;
   increasing the idling speed of the internal combustion engine wherein a generator for electrically supplying the on-board power system is driven by means of the internal combustion engine, and wherein the internal combustion engine is connected to a transmission of the motor vehicle,
   disconnecting the connection between the internal combustion engine and the transmission and
   providing a predetermined braking force by means of at least one brake of the motor vehicle if the predetermined power request is detected, and
   wherein the predetermined power request is determined as a function of a gradient of a torque to be provided by the internal combustion engine.

2. The method according to claim 1, further comprising performing an additional check if an emergency mode situation applies in which transfer of electric power from a high-voltage storage device and/or a medium-voltage storage device of the motor vehicle to a high-voltage on-board power system and/or a medium-voltage on-board power system of the motor vehicle does not occur.

3. The method according to claim 2, wherein disconnecting the connection between the internal combustion engine and the transmission and providing the predetermined braking force are performed in parallel.

4. The method according to claim 2, wherein disconnecting the connection between the internal combustion engine and the transmission occurs before providing the predetermined braking force.

5. The method according to claim 2, further comprising increasing the idling speed if the connection between the internal combustion engine and the transmission is disconnected and/or the predetermined braking force is provided.

6. The method according to claim 1, wherein disconnecting the connection between the internal combustion engine and the transmission and providing the predetermined braking force are performed in parallel.

7. The method according to claim 6, further comprising increasing the idling speed if the connection between the internal combustion engine and the transmission is disconnected and the predetermined braking force is provided.

8. The method according to claim 1, wherein disconnecting the connection between the internal combustion engine and the transmission occurs before providing the predetermined braking force.

9. The method according to claim 8, further comprising increasing the idling speed if the connection between the internal combustion engine and the transmission is disconnected and the predetermined braking force is provided.

10. The method according to claim 1, further comprising increasing the idling speed if the connection between the internal combustion engine and the transmission is disconnected and/or the predetermined braking force is provided.

11. The method according to claim 1, wherein the method is performed if the transmission is in a driving gear for forward or reverse driving.

12. A device for setting an idling speed of an internal combustion engine of a motor vehicle, wherein a generator for electrically supplying an on-board power system of the motor vehicle is driven by means of the internal combustion engine, and wherein the internal combustion engine is connected to a transmission of the motor vehicle, having a detection means for detecting a predetermined power request within the on-board power system and having a control means for increasing the idling speed of the internal combustion engine if the detection means detects the predetermined power request, wherein
    the control means is adapted to output a control signal for disconnecting the connection between the internal combustion engine and the transmission and/or for providing a predetermined braking force by means of at least one brake of the motor vehicle if the predetermined power request is detected, wherein that the predetermined power request is determined as a function of a gradient of a torque to be provided by the internal combustion engine.

13. A motor vehicle having a device according to claim 12, an internal combustion engine, a generator, an on-board power system, and a transmission.

14. The motor vehicle according to claim 13, wherein the transmission is configured as an automatic transmission.

* * * * *